United States Patent [19]

Pound

[11] 4,313,762

[45] Feb. 2, 1982

[54] METHOD OF WASTING FLY ASH AND PRODUCT PRODUCED THEREBY

[75] Inventor: Joseph H. Pound, Mt. Prospect, Ill.

[73] Assignee: American Fly Ash Company, Des Plaines, Ill.

[21] Appl. No.: 949,659

[22] Filed: Oct. 10, 1978

[51] Int. Cl.³ .............................................. C04B 7/12
[52] U.S. Cl. ..................... 106/85; 106/118; 106/120; 106/DIG. 1; 405/129
[58] Field of Search ................... 106/97, DIG. 1, 118, 106/120; 405/266, 267, 128, 129, 268

[56] References Cited

U.S. PATENT DOCUMENTS

| | | | |
|---|---|---|---|
| 3,854,968 | 12/1974 | Minnick et al. | 106/DIG. 1 |
| 3,859,799 | 1/1975 | Jaco | 106/DIG. 1 |
| 4,028,130 | 7/1977 | Webster et al. | 106/DIG. 1 |
| 4,084,381 | 4/1978 | Cain et al. | 106/118 |

*Primary Examiner*—James Poer

[57] ABSTRACT

This invention relates generally to a process and system for wasting fly ash, and is specifically directed to a fly ash wasting system which provides an economical and environmentally acceptable mode of wasting fly ash which has been generated in large quantities per unit of time, as in the case of coal-burning power generating stations.

9 Claims, 3 Drawing Figures

METHOD OF WASTING FLY ASH AND PRODUCT PRODUCED THEREBY

BACKGROUND OF THE INVENTION

Disposition of fly ash, which is essentially fine solid non-combustible mineral residues (not to be equated with bottom ash, cinders, or slag) from coal-burning installations such as power generating plants is an increasingly difficult problem. Recent and increasingly strict environmental restrictions pertaining to the handling and final placement of fly ash, and the currently available technology (which was developed without prime importance being attributed to environmental considerations) have combined to make the wasting of fly ash a source of rapidly escalating costs and environmental concerns common to nearly all coal-burning plants.

One of the greatest sources of fly ash, and a source which invariably impinges heavily on populated areas, is power generating facilities. Accordingly, the invention of this application will be described in terms of the handling (in a transporting sense) and the treatment of fly ash which is generated at a power station. It should be understood however that the inventive concepts described herein are applicable to any source of fly ash generation.

Two methods of wasting fly ash which have been utilized in connection with power plant operations are the "conditioning" method, and the "water solution" method.

In the conditioning method of wasting fly ash, just sufficient water is added to the bone dry (less than one percent moisture content) fly ash to calm the dust. Although the ratio of the weight of water added to the total weight of the fly ash and water product (which is hereafter referred to as the water content) will vary with the type of fly ash (which of course varies with the type or types of coal burned in the boiler, and its condition—i.e.: crushed or pulverized), a water content of about 20 percent is the maximum upper limit of water used in the conditioning process.

The water solution of wasting fly ash requires a water content of about ninety percent.

The conditioning system is becoming less and less suitable to today's needs since fugitive dust is always a problem no matter how carefully the process is monitored, and handling problems are invariably encountered. For example, if the fly ash is damped or conditioned at the power station prior to transportation to the final disposal site, it may be impossible to dump the conditioned fly ash from the haulage vehicle at the disposal site. Conditioning fly ash is also a very expensive system since much heavy equipment, such as bulldozers, must be employed, and after-placement problems, such as leaching, is ever present.

The water solution process requires large quantities of water. On many occasions such quantities are simply not readily available, or only available at very high costs, such as in arid climates. Further, expensive site preparation procedures, such as cell liners, must be employed.

Accordingly it is the primary object of this invention to provide a process and system for wasting fly ash which is economical, environmentally acceptable, and avoids at least the major disadvantages of all currently known systems, including the conditioning and water solution processes described above.

A specific object of the invention is to provide a method of and system for wasting fly ash whereby the fly ash is handled in transit to, and at the disposal site, in a manner which eliminates all fugitive dust.

A further object is to provide a method of wasting fly ash in which the final mixture will have a moisture content of about 25 percent to 50 percent, or the equivalent flowability thereof, and in which the moisture content and the bulk density of the mass will be uniform throughout.

Another object of the invention is to provide a process of wasting fly ash and a system therefor which results in no bleed water being generated at any point in the process.

Yet another object is to provide a fly ash wasting system which lends itself to chemical control of sulfate residues, which is particularly advantageous in connection with handling fly ash from high sulphur coal.

Yet a further object is to provide a process and system of wasting fly ash in which the processed fly ash can be pumped without clogging pipe lines for up to several thousand feet and yet, after placement, will harden into a stable mass which will support significant structural loads of up to several thousand pounds per square foot.

Yet another object is to provide a fly ash wasting system in which the final, hardened product meets all current environmental requirements, and is virtually impervious to percolation from gound water and rainfall whereby the pollution potential in the disposal area is virtually eliminated.

Yet a further object is to provide a fly ash wasting system in which on-site dust at the disposal location is reduced to a minimum because aggregate handling equipment, such as bulldozers, truck deliveries, compaction equipment and grading equipment (all of which are utilized in current wasting systems) are completely eliminated.

A further object is to provide a fly ash wasting system and process which is more economical to operate then many conventional systems due to the above advantages whereby special precautionary measures to protect against dust, etc. are eliminated, and capital equipment and labor costs are lower than in most, if not all, current wasting systems.

BRIEF DESCRIPTION OF THE INVENTION

The invention will be described in terms of handling bone dry (less than one percent moisture content) fly ash produced as a combustion by-product at a coal fired power generating station. It will be assumed that the fly ash has cooled and has been removed from the boiler in the power generating station and transferred by any conventional means to a closed storage silo at the power station preparatory to being wasted. It will also be assumed that the final disposal site is located a substantial distance from the power station and consists of a relatively flat land fill area of conventional size such as, for example, about five acres.

The bone dry fly ash is discharged from the power station generating silo into a closed chamber transport vehicle, such as a pneumatic bulk transport truck. After filling, the truck is sealed to prevent dust leakage during transit to the processing plant which is located adjacent the final disposal site.

At the processing plant the bone dry fly ash is transferred from the bulk trailer to a storage silo which has a discharge outlet positioned to discharge the dry fly ash into a slurrier.

After suffficient material is available in the storage silo, the discharge outlet is opened to feed the dry fly ash into the slurrier where it is mixed with sufficient water to yield a final water content of from about 25 percent to 50 percent or, more preferably, from about 30 percent to 40 percent, or the equivalent thereof, depending to some extent on the type and condition of the fly ash. The storage silo may be pressurized to facilitate discharge of the dry fly ash into the slurrier.

The resultant slurry is then moved to a slurry loading tank (which may be at a higher elevation then the slurrier) under the impetus of the force derived from the water pressure in the system.

The slurry in the slurry tank is discharged via a pipe to a slurry pump.

After passing through the pump the slurry is transported by the pressure generated in the pump for up to several thousand feet to a disposal cell at the disposal site.

The disposal site may be divided into a plurality of cells, each of which preferably corresponds to the expected production capacity of a predetermined time period, such as a week. The cell, which need not be lined, may consist of depressed areas bounded by walls constructed from existing site materials, or other combustible by-products, such as bottom ash or slag.

The slurry is discharged into a cell whose height is, technically, virtually unlimited. The actual height will usually be governed by environmental considerations. Heights of two to three feet may be employed to advantage.

After deposition into the cell, the slurry is permitted to harden under exposure to ambient weather conditions. After about three hours of time in relatively dry and warm (about 45 degrees F. weather), the slurry will support a 200 pound person. Within a week, it will support heavy equipment, such as trucks and end loaders.

DETAILED DESCRIPTION OF THE INVENTION

The invention is illustrated more or less diagrammatically in the following Figures wherein.

Figure 1:
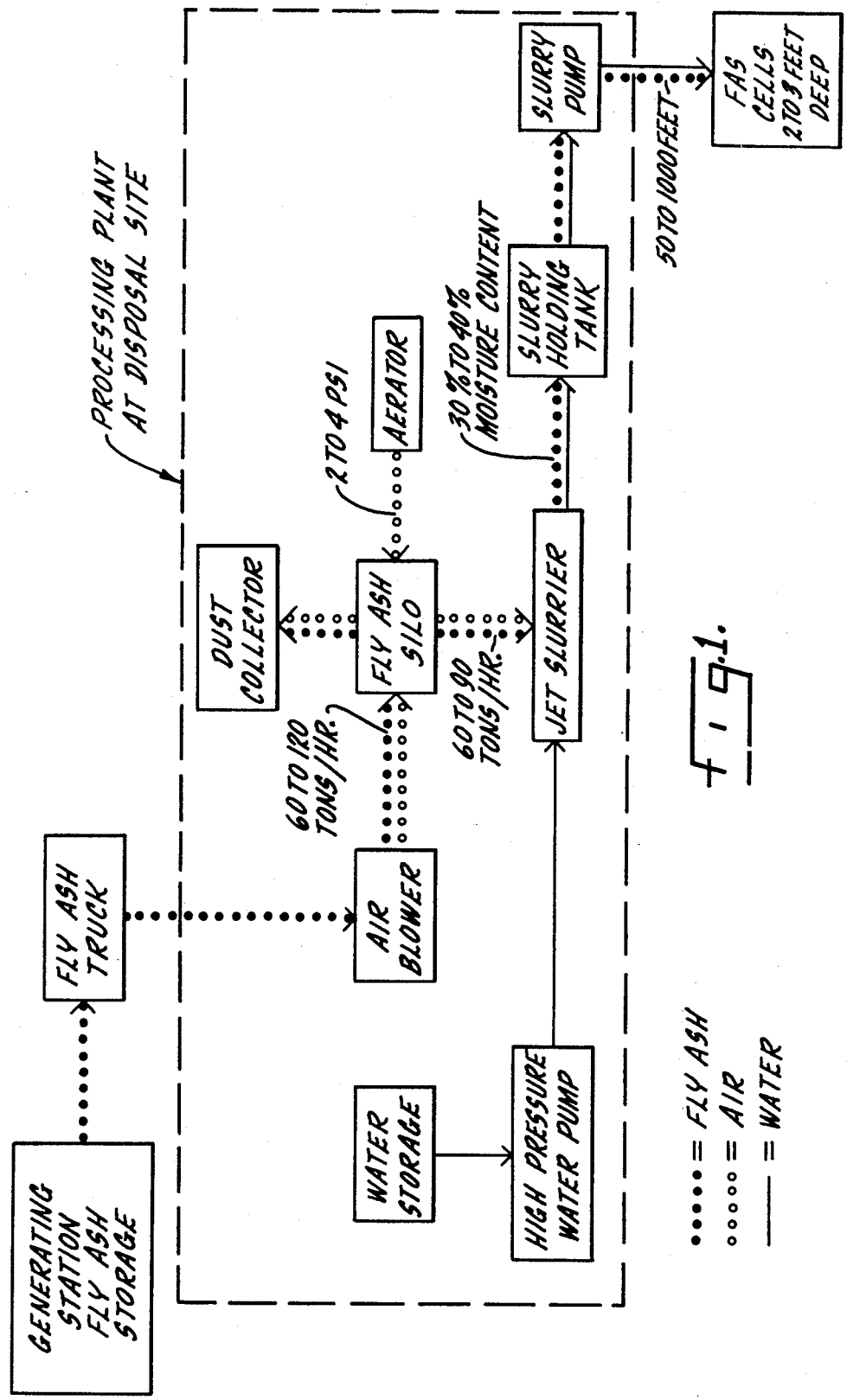
FIG. 1 is a flow diagram illustrating the handling and processing steps in the wasting process commencing at the storage area at the power generating station, and terminating at the disposal site cell.

Bone dry fly ash, which will hereafter be referred to simply as "dry fly ash" from the combustion of coal in a power generating station is conveyed by any conventional means from the power generating station boiler system to a silo, which is referred to in FIG. 1 as the Generating Station Fly Ash Storage.

A bulk transport truck is positioned under the silo to receive the dry fly ash. The truck is a pneumatic truck having one or more compartments, with each compartment having a hatch on the top and an air circulating device, such as an air pad, an air stone, or a cyclone at the bottom of each compartment, together with a compartment exit pipe. As is well known in the art, the trucks are constructed so that with all hatches and appurtenances closed, the truck is air tight.

After positioning beneath the silo, at least two hatches on the top of the truck are opened and a loading mechanism, such as a hose or metal pipe, is lowered into one of the hatches. The loading mechanism may, for example consist of, firstly, an interior spout or chute which conveys the dry fly ash from the silo into the truck, and, secondly, an exterior spout or chute which is attached to a dust collector or bag house on top of the storage silo. The function of the exterior chute is to collect fugitive dust from the truck filling operation as the dry fly ash passes downwardly through the interior chute.

After receiving a load of dry fly ash at the generating station storate silo, the truck hatches are fastened to form an air tight compartment, and the truck transports the fly ash to the processing plant at the disposal or fill site.

At the disposal site, an air hose is attached to the inlet pipe of the bulk trailer. Said trailer may be equipped with a permanent blower to which the air hose may be connected. The bulk trailer is then air pressurized. In one specific application a three inch air hose powered by an electric motor capable of producing a minimum of 800 cubic feet or air per minute at a pressure of 20 pounds per square inch was found satisfactory when operating with bulk trailers of the 870 cubic foot-1500 cubic foot size. A four inch air discharge hose from the trailer outlet was connected to a pipe which terminates at a dry fly ash storage silo in the processing station.

Once appropriate pressure is generated within the bulk trailer, such as, for example, about 15 pounds per square inch, the exit pipe valve system is opened and the dry fly ash thereby transferred from the bulk trailer to the storage silo.

It will be understood that in an operating system the tractor will merely position the trailer beneath the processing plant storage silo, and will then disconnect, reconnect with an empty bulk trailer which has been earlier emptied, and return to the power generating station fly ash storage silo area.

Dry fly ash in the processing plant storage silo is then fed from an opening in the bottom of the silo into a jet slurrier. preferably an aerator is connected to the silo near the bottom thereof to facilitate the flow of dry ash into the jet slurrier. An aerator capable of producing a regulated flow of air varying from one psi to eight psi has been found sufficient to keep the dry fly ash flowing and prevent consolidation of ash within the silo.

The dry fly ash moves from the silo via a conduit, such as a strong, flexible hose, into the receiving hopper of the jet slurrier.

The jet slurrier consists of a hopper which is preferably conical in shape, and which slopes inwardly, downwardly to a relatively small exit diameter say, on the order of about six inches.

The hopper exit discharges into the mixing bowl of the jet slurrier.

A source of water under pressure also discharges into the mixing bowl of the jet slurrier. Since the construction and operation of the jet slurrier does not, per se, comprise the essence of the invention, and since several jet slurriers of conventional design will be suitable for the described application, the details of operation of the slurrier are not further described. In one embodiment, a jet slurrier in which the water jet system included a rotating shaft with four openings of various sizes was employed with excellent results. Each opening on the rotating water jet shaft can be locked into the desired position whereby the sized openings automatically regulate the water flowing to the jet slurrier, and thereby determine, together with the fly ash feed rate, the consistency of the slurry leaving the slurrier.

The water jet system should include a high pressure water pump which is connected to a suitable source of water storage. In one embodiment a pump having a capacity range of 80 gallons per minute of water at 120 psi through 270 gallons of water at 60 psi using a two inch diameter outlet pipe produced satisfactory results.

The fly ash—water slurry which exits from the jet slurrier is then moved under the pressure of the water jet system to a slurry holding tank. The slurry holding tank may be located any convenient distance from the jet slurrier and may be at a higher elevation then the slurrier. In one embodiment, a pipe connected to the outlet of the jet slurrier sloped upward at about a 45 degree angle to up to nine feet above the jet slurrier. Preferably the discharge end of the jet slurrier discharge pipe should have a small chamber with 30 degrees steel ridges on the sides thereof to ensure proper mixing. The wet slurry is then discharged from the jet slurrier discharge pipe into a slurry holding tank.

As soon as the slurry holding tank is filled to a level which will ensure that the system will not run dry due to a temporary interruption of material, the discharge of the tank is opened to permit the slurry to flow into a pipe which is connected to the suction end of a slurry pump. The slurry pump should be of heavy-duty construction and, preferably, capable of passing two inch diameter solids.

The discharge outlet of the slurry pump is connected to piping which transports the pressurized slurry to a disposal cell.

Disposal cells should be sized according to plant loading. Although technically there would appear to be no limitation on the depth of the cells, environmental consideration may dictate that the height of the cells be regulated. Cell heights of between two to three feet should facilitate maximum land usage. The cells can be constructed of existing site material or other combustion by-products, such as bottom ash or slag. It should be noted that the piping between the discharge outlet of the slurry pump and the cells should be so arranged as to be easily drained.

After placement in the cell the slurry is permitted to harden under exposure to ambient weather conditions. The curing time will vary, depending on the chemical composition of the slurry and the water content thereof.

If, for example, the water content of the slurry is in the range of 30 percent to 40 percent, low permeabilities ($10^{-6}$ to $10^{-8}$) should be achievable, and there will be no excess water available to run off from the cell area. If the ambient weather conditions are relatively dry and warm, that is, above 45 degrees F., the slurry will support a 200 pound person within three hours of placement and will support heavy equipment, such as trucks and end loaders, within seven days.

It will thus be noted that a dry fly ash disposal process in which fly ash is transported and conditioned in a closed system until a slurry is formed has been provided. Further, comparisons indicate that once a fly ash slurry is in place at the disposal site, it will have up to one-third greater dry weight per unit volume then other disposal processes which results in a number of economic advantages. One important economic advantage is that the useful life of any disposal site is correspondingly extended. Further, the system is so designed that minimal water requirements are placed on water supply systems since all run-off water within the disposal site can be collected and used in the process.

Another unique advantage is that, if well planned, it may be possible to break up the hardened cells at a later date when the fly ash which compose the cells is required as an additive for concrete.

Specifically, as is now well-established, the addition of small quantities of fly ash to concrete is widely employed for the purpose of enabling the concrete to preserve good flow characteristics which of course is particularly important when pouring structural concrete. One difficulty experienced by contractors is a substantial variation in the supply of fly ash. Thus, during the warm weather months when construction activity is at its peak, fly ash generation may not be sufficiently great to satisfy the demand. Conversely, during cold weather months, particularly in the northern regions of the country, construction activity may be at a greatly reduced level, and the supply of fly ash may be much greater than the demand.

Since the dry cells are composed of, in essence, adhered fly ash particles which can be relatively easily broken by front end loaders and pulverized, the excess quantities of fly ash placed into disposal cells during periods of low fly ash demand in the construction industry can, in effect, be stored for later use when the construction industry demand outstrips the supply of fly ash generated by the power stations.

It should also be noted that the dikes at the disposal site may be made of any convenient material, such as site material, bottom ash, or even the fly ash slurry by using forms. The placement of fly ash slurry into a cell bounded by previously placed fly ash dikes will have no effect on the fly ash dikes since chemical reactions have taken place which are irreversible by mere subjection to fly ash slurry.

It should also be noted that the process lends itself to the use of chemical additives for minimizing the amount of water needed for adequate pumping and flowability at the disposal site.

In effect, water is required only to impart pumpability to the mixture, and enable the mixture to be moved for up to several thousand feet from the discharge exit of the slurry pump to the disposal cell. If water is not readily and economically available, certain chemicals can be substituted for a portion of the water to provide the necessary pumpability and flowability. Such chemicals may include water reducing admixtures such as those generally designated as ASTM C-494, Melamine derivatives, chemical retarders and air entraining liquid admixtures. If additional compressive strength and/or improved setting up is desired pulverized quickline, hydrated lime, flue dust from either lime plants or Portland Cement Plants and/or Portland Cement may be added. The proper selection will be a function of numerous criteria including achieved flowability characteristics, hardening time, and economics.

It should also be noted that after filling of a disposal cell, the surface may be sealed off if desired by the addition of a sulfate barrier agent. This may be particularly necessary when the fly ash has a substantial sulfate content and preclusion of sulfate emissions to the atmosphere is desired.

Examples of the amount of conditioning water needed to produce a pumpable fly ash—water slurry, the time periods between initial mixing of the water and fly ash and the setting up of the slurry, and the permeability of the fly ash after setting are given below.

Table 1 contains the chemical analyses of five fly ash samples, each sample being taken from a power generating station located in the upper Mid-West.

The two fly ashes B and C were taken from the same coal source but specimen B was taken from a boiler using powdered coal only, and specimen C was taken from a silo which received fly ash from two units, one unit using powered coal and the other unit using crushed coal.

In the testing procedure, each sample was conditioned with a predetermined amount of water in amounts varying from 20 to 50 percent of water expressed as a percent of water to the dry weight of fly ash.

During the testing procedure one half of the water was placed in the mixing bowl of a counter rotating mixture with the muller attachment deactivated. The fly ash was added to the water and the mixing started. As soon as the fly ash and water were blended the remainder of the conditioning water was added and the mixing continued. At periodic intervals samples were taken from the mixture and tested.

Flow tests were conducted in accordance with the procedure stated in ASTM Designation C-109 for determining the flow of concrete mortar, except only ten drops of the drop table were employed. The flow of the slurry was determined in the same manner as described in the ASTM procedure. Flow measurements were continued at selected intervals until the slurry had set up to the point where it could no longer be effectively compacted in the flow mold device, which time period was usually between two and one half and six hours after initial mixing.

Between approximately 15 and 30 minutes after initial mixing, permeability samples were made up of the slurry. Specifically, slurry was introduced into two inch diameter by four inch high steel molds which rested on a drop table. The slurry was introduced into the molds in three approximately equal increments and the drop table was dropped ten times after the introduction of each increment to compact the slurry and remove any air pockets. When filled, the samples were placed in a moist room and cured at 73 degrees Fahrenheit until tested for strength and permeability.

The permeability tests were conducted after one, seven and fourteen days curing at 73 degrees F. A constant head permeability was run on the cured specimens prior to their removal from the molds. The water head for the test was provided by introducing water under controlled pressure to the top of the specimens and measuring the flow of water through the specimens. All specimens were tested under two levels of water head, namely, 10 psi and 30 psi, which are, respectively, equivalent to water heads of approximately 23 and 70 feet.

Following completion of the permeability tests, the specimens were removed from the molds and tested in compression.

The following results were obtained.

TABLE 1

| Sample | A | B | C | D | E |
|---|---|---|---|---|---|
| $SiO_2$ | 28.80 | 41.61 | 42.21 | 41.50 | 38.59 |
| $Al_2O_3$ | 18.80 | 17.72 | 15.05 | 18.29 | 18.96 |
| $TiO_2$ | 1.11 | 0.70 | 0.67 | 0.73 | 1.02 |
| $Fe_2O_3$ | 7.58 | 5.42 | 5.28 | 5.33 | 12.24 |
| CaO | 17.15 | 21.59 | 23.25 | 20.74 | 13.46 |
| MgO | 3.80 | 3.43 | 3.25 | 3.35 | 2.75 |
| $Na_2O$ | 8.93 | 1.58 | 1.13 | 2.47 | 4.40 |
| $K_2O$ | 0.60 | 1.01 | 0.94 | 0.92 | 1.29 |
| $SO_3$ | 5.74 | 1.58 | 1.77 | 1.68 | 3.08 |
| $H_2O$ | 0.50 | 0.09 | 0.35 | 0.19 | 0.07 |
| Unanalyzed Residue | Bal. | Bal. | Bal. | Bal. | Bal. |
| $SiO_2 + Al_2O_3 + Fe_2O_3$ | 55.18 | 64.75 | 62.54 | 65.12 | 69.79 |

TABLE 2
FLY ASH - TYPE A

*Moisture Content - 20%; Flow Initial - 30%*

| Curing Time | 1 day | 7 days | 14 days |
|---|---|---|---|
| Permeability (cm/sec) | $<10^{-8}$ | $<10^{-8}$ | $<10^{-8}$ |
| Comp. Str. (psi) | 180 | 500 | 450 |

With continuous mixing, thickening started at about 2 hours, complete set at 3 hours.

*Moisture Content - 25%; Initial Flow - 40%*

| Curing Time | 1 day | 7 days | 14 days |
|---|---|---|---|
| Permeability (cm/sec) | $7 \times 10^{-7}$ | $<10^{-8}$ | $<10^{-8}$ |
| Comp. Str. (psi) | 80 | 500 | 600 |

Without mixing, thickening started after about 30 to 45 minutes, but significant thickening did not occur until about 2 hours as shown by the flow values:

| Mixing time (minutes) | 15 | 30 | 45 | 60 | 90 | 120 |
|---|---|---|---|---|---|---|
| Flow | 138 | 138 | 128 | 125 | 122 | 100 |

*Moisture Content - 30%; Initial Flow - NA*

| Curing Time | 1 day | 7 days | 14 days |
|---|---|---|---|
| Permeability (cm/sec) | $1 \times 10^{-7}$ | $1 \times 10^{-7}$ | $5 \times 10^{-8}$ |
| Comp. Str. (psi) | 70 | 250 | 320 |

With continuous mixing, the mixture thickened after about 6 hours.

*Moisture Content - 40%; Initial Flow - NA*

| Curing Time | 1 day | 7 days | 14 days |
|---|---|---|---|
| Permeability (cm/sec) | $2 \times 10^{-6}$ | $5 \times 10^{-7}$ | $2 \times 10^{-7}$ |
| Comp. Str. (psi) | 40 | 110 | 150 |

TABLE 3
FLY ASH - TYPE B

*Moisture Content - 35%; Initial Flow - 50%*

| Curing Time at 73° F. | 1 day | 7 days | 14 days |
|---|---|---|---|
| Permeability (cm/sec) | $5 \times 10^{-8}$ | $1 \times 10^{-8}$ | $1 \times 10^{-8}$ |
| Comp. Strength (psi) | 180 | 620 | 1024 |

*Moisture Content - 50%; Initial Flow - 100%*

| Curing Time at 73° F. | 1 day | 15 days |
|---|---|---|
| Permeability (cm/sec) | $6 \times 10^{-6}$ | $5 \times 10^{-7}$ |
| Comp. Strength (psi) | 16 | 40 |

TABLE 4

FLY ASH - TYPE C

Moisture Content - 35%; Initial Flow - NA

| Curing Time at 73° F. | 1 day | 7 days | 14 days |
|---|---|---|---|
| Permeability (cm/sec) | $6 \times 10^{-7}$ | $5 \times 10^{-8}$ | $3 \times 10^{-8}$ |
| Comp. Strength (psi) | 38 | 30 | 137 |

Moisture Content - 50%; Initial Flow - 75%

| Curing Time at 73° F. | 2 days | 5 days | 14 days |
|---|---|---|---|
| Permeability (cm/sec) | $2 \times 10^{-6}$ | $3 \times 10^{-7}$ | $5 \times 10^{-7}$ |
| Comp. Strength (psi) | 75 | 150 | 195 |

TABLE 5

FLY ASH - TYPE D

Moisture content - 25%; Initial Flow - 28%

| Curing Time at 73° F. | 1 day | 7 days | 14 days | |
|---|---|---|---|---|
| Permeability (cm/sec) | $4 \times 10^{-6}$ | $6 \times 10^{-7}$ | $2 \times 10^{-7}$ | Approx. 20% expansion during curing |

Started to thicken after 45 minutes under continuous mixing; completely set up after 60 minutes.

Moisture Content - 30%; Initial Flow - 40%

| Curing Time at 73° F. | 1 day | 7 days | 14 days | |
|---|---|---|---|---|
| Permeability (cm/sec) | $4 \times 10^{-6}$ | $3 \times 10^{-6}$ | $1 \times 10^{-7}$ | No expansion noted |
| Comp. Str. (psi) | 55 | — | 120 | |

Started to thicken after 2 hours of continuous mixing
With continuous mixing, flow decreased as follows:

| Time | 0 (initial) | 15 min. | 30 min. | 45 min. | 60 min. |
|---|---|---|---|---|---|
| Flow | 14 | 128% | 109% | 103% | 100* |

Moisture Content - 40%; Initial Flow - 63%

| Curing Time at 73° F. | 1 day | 7 days | 14 days |
|---|---|---|---|
| Permeability (c/msec) | $1 \times 10^{-5}$ | $6 \times 10^{-6}$ | $4 \times 10^{-6}$ |
| Comp. Str. (psi) | 20 | 31 | 65 |

Started to thicken after 4¼ hours and was set firm after 6 hours with continuous mixing. Without continuous mixing the flow decreased as follows:

| Time (Min.) | 0 | 15 | 30 | 45 | 60 | 90 | 120 | 180 |
|---|---|---|---|---|---|---|---|---|
| Flow | 240 | 162 | 151 | 140 | 135 | 125 | 115 | 108 |

Note: There was a substantial decrease in the flow value during the first 15 minutes, but subsequently the thickening proceeded at a slower rate through the three hours of observation.

Moisture Content - 50%; Initial Flow - NA. too wet to measure

| Curing Time at 73° F. | 1 day | 7 days | 14 days |
|---|---|---|---|
| Permeability (cm/sec) | $4 \times 10^{-5}$ | $2 \times 10^{-5}$ | $2 \times 10^{-5}$ |
| Comp. Str. (psi) | 9 | 20 | neg. |

*After 60 minutes without mixing, the mix was too stiff to flow.

In general, the permeability decreased substantially between the 1 and 7 days of curing and increased with increased moisture content of the mixture. There was no free water observed on any of the specimens tested.

A moisture content of between 25 and 50 percent should provide handling time of 2 to 3 hours with continuous mixing and up to one hour with little or no mixing.

TABLE 6

FLY ASH - TYPE E

Moisture Content - 20%; Flow - NA

| Curing Time | 1 day | 7 days | 14 days |
|---|---|---|---|
| Permeability (cm/sec) | $<10^{-8}$ | $<10^{-8}$ | $<10^{-8}$ |
| Comp. Str. (psi) | 180 | 1120 | 1300 |

This material was completely set in less than one hour with continuous mixing.

Moisture Content - 25%; Flow - 45%

Permeability only taken after No Cure with the following mixing times:

| Mixing Time (minutes) | 15 | 45 | 90 |
|---|---|---|---|
| Permeability (cm/sec) | $4 \times 10^{-7}$ | $4 \times 10^{-7}$ | $4 \times 10^{-7}$ |

Without mixing the mixture had completely dried out after 15 minutes.

Moisture content - 30%; Initial Flow - 80%

| Curing Time | 1 day | 7 days | 14 days |
|---|---|---|---|
| Permeability (cm/sec) | $5 \times 10^{-6}$ | $4 \times 10^{-6}$ | $8 \times 10^{-7}$ |
| Comp. Str. (psi) | 330 | 210 | 330 |

Started to thicken after 2 hours with continuous mixing, set up at about 4 hours. Without continuous mixing, the flow varied as follows:

| Set Time (minutes) | 0 (initial) | 15 | 30 |
|---|---|---|---|
| Flow | 160% | 125% | 106% |

Thickening was apparent after 15 minutes and the mass had completely dried up after 45 minutes.

Moisture Content - 40%; Flow - NA

| Curing Time | 1 day | 7 days | 14 days |
|---|---|---|---|
| Permeability (cm/sec) | $2 \times 10^{-6}$ | $6 \times 10^{-7}$ | — |
| Comp. Str. (psi) | 40 | 180 | — |

Dried out after 4 hours with continuous mixing.

Moisture Content - 50%; Flow - NA

| Curing Time | 7 days | 14 days |
|---|---|---|
| Permeability (cm/sec) | $8 \times 10^{-5}$ | $2 \times 10^{-5}$ |
| Comp. Str. (psi) | 30 | 35 |

It should be noted that there was such a small difference between the high and low head tests that the results were averaged for tabulation.

It will be noted that there is a significant reduction in permeability when comparing the 7 and 14 day test results to the one day test results. This is to be expected from prior studies on lime-fly ash-aggregate mixtures which generally disclose a sharp drop in permeability during the first day or two of curing, and a continual, gradual drop subsequently.

Figure 3:
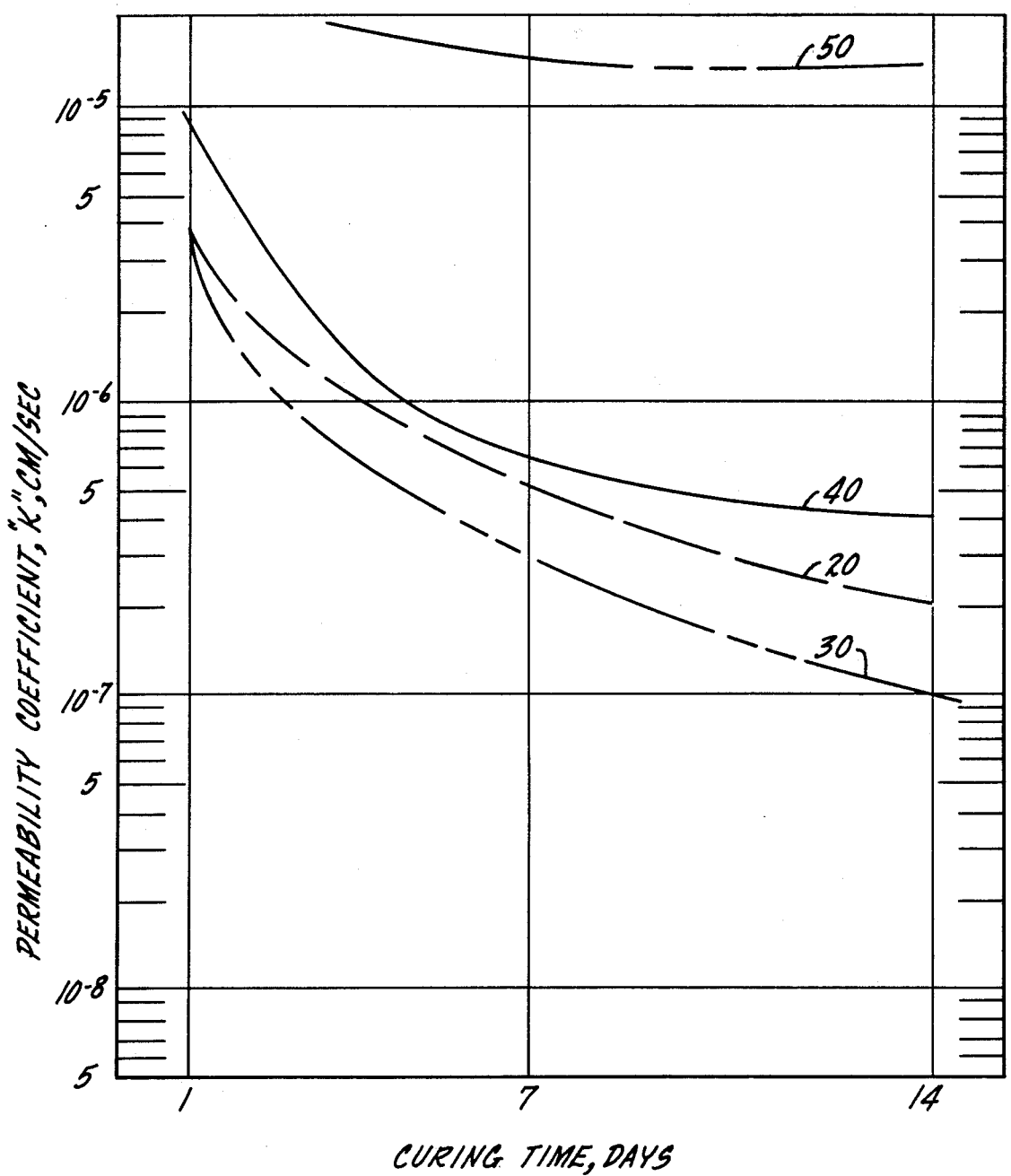
FIG. 3 is a graph illustrating the effect of curing time on the permeability of conditioned fly ash.

With respect to the affect of curing time on the permeability, note particularly Table 5, and FIG. 3. Although the fly ash of type D is disclosed, in Table 5, as having the highest permeability of all fly ashes tested, the trend of decreasing permeability with time fitted the normal pattern for all fly ashes tested.

Conditioning moisture content also has a significant influence on the permeability of the cured slurries.

Figure 2:
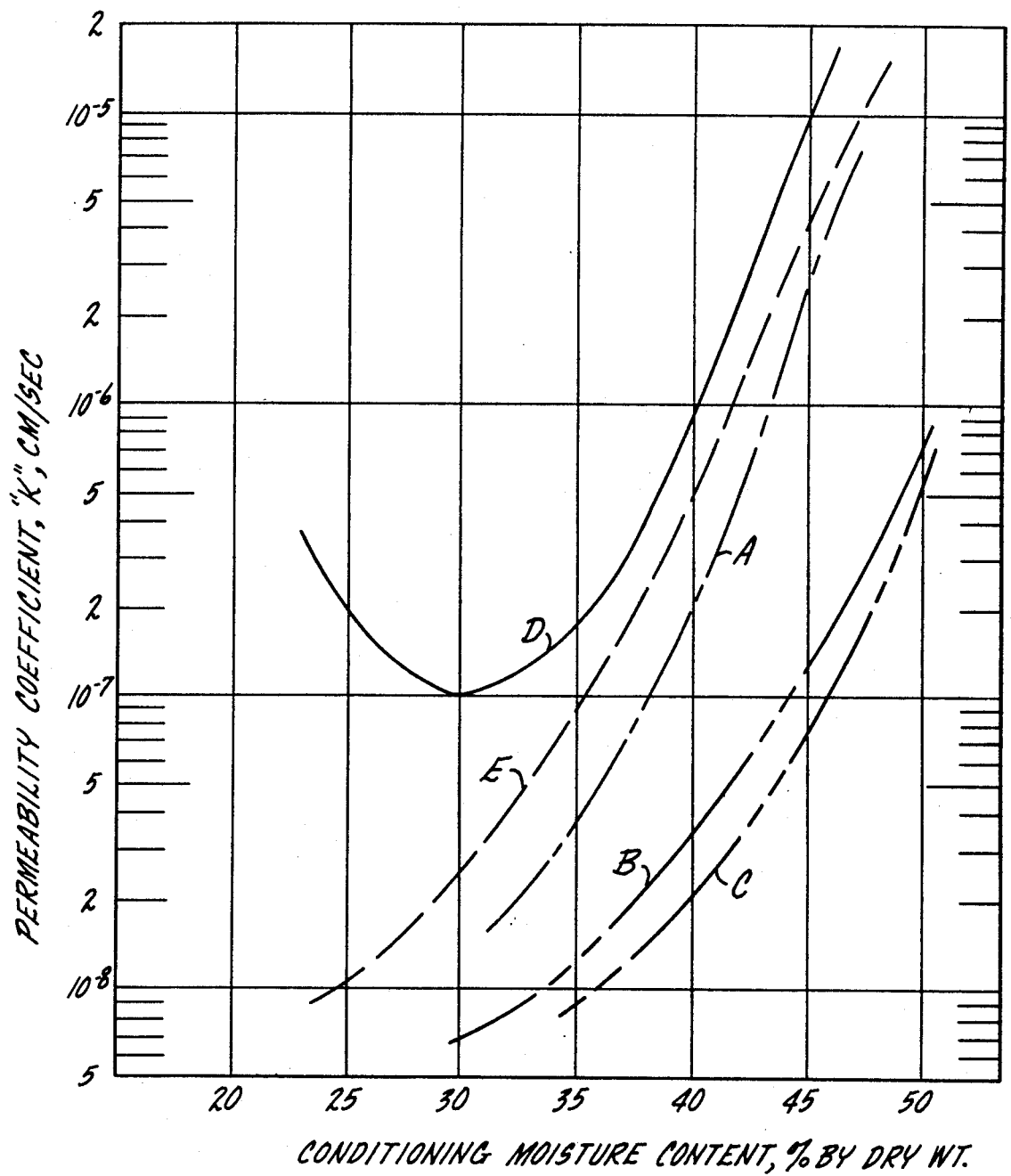
FIG. 2 is a graph illustrating the effect of conditioning moisture content on the permeability of treated fly ash after fourteen days curing.

FIG. 2 shows the trends of the permeabilities versus conditioning moisture content for the five fly ashes tested after 14 days.

From the curves it is obvious that increasing the mixing moisture content can result in slurries with increased permeabilities. This trend cannot be extented indefinitely however for if the mixing moisture content becomes too low the slurry will not properly flow and compact, with a resultant increase in permeability. This phenomena can be seen in connection with the curve for the type D fly ash.

The strength tests, while somewhat erratic, disclosed that the slurries gain strength with curing time. It also appears that the slurries generally decrease in strength with increasing mixing water content.

It should be noted that despite the effects of mixing moisture content on the flow, permeability, and strength of the slurries, at no time did any free water appear. Indeed, no bleeding was observed even at the 50% moisture contents.

In summary, in order to achieve adequate workability whereby the fly ash slurries may be pumped to the disposal cells, a minimum mixing moisture content must be employed, which content, based on the above data, appears to be in the range of 20 percent, or possibly even slightly below.

Further, if the mixing moisture content is too great the level of permeability may become excessive and the slurry may have inadequate strength.

Based on the above data, it appears that an intermediate mixing moisture content of between about 25 and 50 percent, or, more preferably, between about 30 and 40 percent provides adequate flow while attaining all other desired properties.

It should further be noted that in all of the above calculations, the weigh of fly ash used, or to be assumed, can be taken as 70 pounds dry weight per cubic foot.

It will thus be seen that a process and system for wasting fly ash has been disclosed which achieves all of the earlier mentioned objects of the invention.

Specifically, and with respect to the economics of the system, it appears that a unit cost for ash disposal alone for less then $2.00 per ton can be achieved, taking into account a proportionate share of expenses prorated over expected useful life of components of the system.

Although a preferred embodiment of the invention has been illustrated and described, it will be apparent to those skilled in the art that variations and modifications may be made within the scope of the inventive concepts.

Accordingly, it is intended that the scope of the invention be limited only by the scope of the hereafter appended claims when interpreted in light of the pertinent prior art, and not by the scope of the specific, exemplary preceding description.

I claim:

1. In an environmentally acceptable method of disposing of fly ash, the steps of
    conveying fly ash in a dry condition from a source location to a processing installation,
    forming a pumpable slurry at the processing installation,
    said pumpable slurry consisting of fly ash and water,
    said water content lying in the range of from no less than about 25% to no more than about 50% of weight of water to weight of dry fly ash,
    said slurry further having the characteristic of being pumpable for a distance of up to several thousand feet,
    depositing the fly ash-water slurry into a disposal site having wall means which contain the slurry until set up occurs,
    said disposal site being exposed to ambient air and ground environmental conditions, and
    hardening the slurry at the disposal site by subjection of said slurry to said conditions.

2. The method of claim 1 further characterized in that
    the fly ash is conveyed in a dry condition from the initial storage location to the processing installation in a closed chamber transport vessel, and further characterized in that
    the fly ash is precluded from contacting the ambient atmosphere at all times prior to make-up into a slurry by containment in a closed vessel, and/or subjection to a pressurized, dust confining environment.

3. The method of claim 1 or 2 further characterized in that
    the slurry is adjusted to have a set-up time of no less than about 3–4 hours subsequent to initial fly ash-water contact in the slurrying process, by matching the water content or the water and supplemental addition content to the chemical composition of the fly ash.

4. The method of claim 1 or claim 2 further including the step of
    adding a sulfate barrier agent to the slurry which forms the uppermost portion of the combined slurry, whereby sulfate emission to the atmosphere is precluded.

5. The method of claim 3 further characterized that an additive used to facilitate pumpability and flowability, if used, is selected from the group consisting of water reducing admixtures, melamine derivatives, chemical retarders, and air entraining liquid admixtures, an additive used to provide additional compressive strength and/or improved setting up, if used, is selected from the group consisting of pulverized quick lime, hydrated lime, lime plant or Portland Cement plant flue dust, and Portland Cement.

6. In an environmentally acceptable method of disposing of fly ash, the steps of
    conveying fly ash in a dry condition from a source location to a processing installation,
    forming a pumpable fly ash-water slurry at the processing station,
    said fly ash-water slurry having a water content of from no less than about 30% to no more than about 40% of weight of water to weight of dry fly ash,
    said slurry further having the characteristic of being pumpable for a distance of up to several thousand feet,
    depositing the fly ash-water slurry into a disposal site having wall means which contain the slurry until set up occurs,
    said disposal site being exposed to ambient air and ground environmental conditions, and
    hardening the slurry at the disposal site by subjection of said slurry to said conditions.

7. The method of claim 6 further characterized in that
    the fly ash is conveyed in a dry condition from the initial storage location to the processing installation in a closed chamber transport vessel, and further characterized in that
    the flay ash is precluded from contacting the ambient atmosphere at all times prior to make-up into a slurry by containment in a closed vessel, and/or subjection to a pressurized, dust confining environment.

8. The method of claim 6 or 7 further characterized in that
    the slurry is adjusted to have a set-up time of no less than about 3–4 hours subsequent to initial fly ash-water contact in the slurrying process by matching the water content or the water and supplemental addition content to the chemical composition of the fly ash.

9. The method of claim 6 or claim 7 further including the step of
    adding a sulfate barrier agent to the slurry which forms the uppermost portion of the confined slurry, whereby sulfate emission to the atmosphere is precluded.

* * * * *